United States Patent [19]

Hibbard et al.

[11] 4,421,992
[45] Dec. 20, 1983

[54] SMART SWITCH

[75] Inventors: Ray W. Hibbard; Randal C. Hines, both of Morristown, Tenn.

[73] Assignee: Nuclear Systems, Inc., Morristown, Tenn.

[21] Appl. No.: 327,406

[22] Filed: Dec. 4, 1981

[51] Int. Cl.³ .............................................. H02J 3/00
[52] U.S. Cl. ..................................................... 307/41
[58] Field of Search ......................... 307/38, 39, 40, 41

[56] References Cited

U.S. PATENT DOCUMENTS

| | | | |
|---|---|---|---|
| 3,497,710 | 2/1970 | Gorman et al. | 307/140 X |
| 3,925,680 | 12/1975 | Dixon | 307/39 |
| 4,138,607 | 2/1979 | Engelmann | 307/41 X |
| 4,216,384 | 8/1980 | Hurley | 307/41 X |
| 4,321,477 | 3/1982 | Bartlett | 307/39 X |
| 4,333,002 | 6/1982 | Kozak | 307/39 X |

Primary Examiner—Elliot A. Goldberg
Assistant Examiner—Derek S. Jennings
Attorney, Agent, or Firm—Pitts, Ruderman & Kesterson

[57] ABSTRACT

Apparatus for controlling the peak load demand of a home or business establishment by preventing the simultaneous application of electrical power to first and second electrical loads is disclosed. The apparatus includes first and second sensing means (16, 18), one each of which monitors each of the first and second electrical loads (12, 14) respectively for determining when the first and second electrical loads (12, 14) are demanding electrical power. The sensing means (16, 18) then provide sensing signals to a combining means (24) which receives the sensing signals, or representations of these sensing signals. Combining means (24) provides a timer start signal to timer (28) when the sensing signals or representations of these sensing signals are present at combining means (24). Included are first and second control means (34, 36) which are connected to the first and second electrical loads (12, 14) and which alternately apply and interrupt electrical power to these electrical loads in response to a control signal received from timer (28). The timing (28) itself is suitable for providing the control signal upon receiving the timing start signal, and in a preferred embodiment provides a square wave signal which varies according to a selected time period between a high and a low value. In the preferred embodiment, the first load control means (34) will only apply power to the first load (14) when the control signal is at a low value and the second load control means (36) will apply power to the second load (12) only when the control signal is at its high value. Also included in the preferred embodiment, are first and second latching means (40, 44) which provides the representative signals whenever timer (28) is operating, regardless of whether or not the sensing means (16, 18) are providing corresponding sensing signals.

12 Claims, 3 Drawing Figures

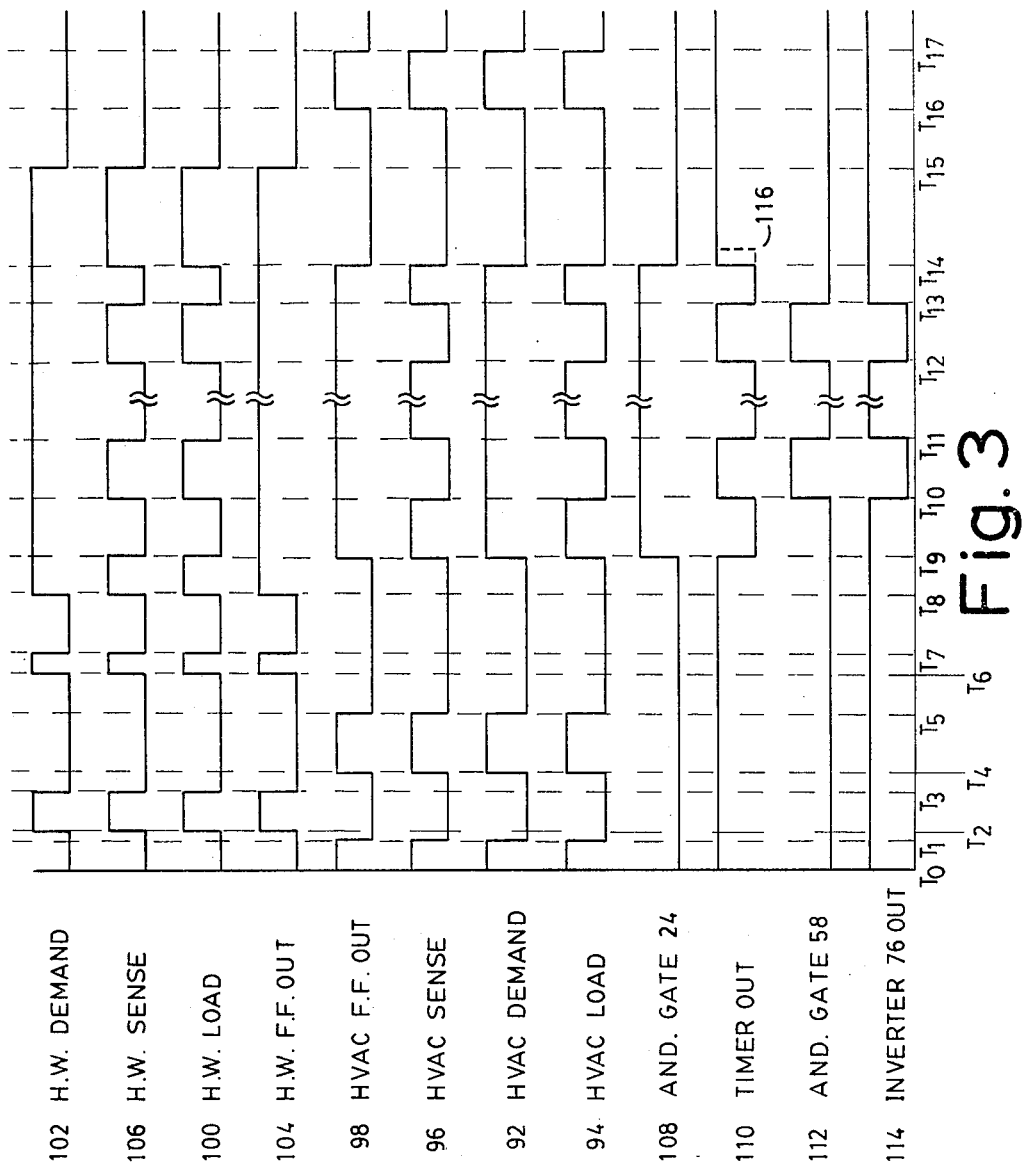

SMART SWITCH

DESCRIPTION

1. Technical Field

This invention relates generally to apparatus and methods for controlling the operation of heavy duty electrical appliances or loads to minimize the cost of the required electrical power. In particularly the apparatus and methods provide techniques for preventing the simultaneous application of power to two items of equipment which require large amounts of electrical power. The simultaneous application of power is prevented, and consequently, the overall peak load is kept to a minimum by alternating the application of power to the equipment or load devices on a time basis whenever both load devices demand the application of electrical power.

2. Background Art

During this period of critical energy shortages, the nation's attention is, of course, being directed toward the development of energy saving devices. At the same time, there are still great demands for additional electrical energy, and consequently electrical power generating plants are still being manufactured and installed to provide for the increase load demands of electrical energy. However, it is also well recognized that power generating stations must be built to have a much greater capacity than is required a majority of the time. This is, because, of course, there are no adequate or convenient techniques for long term storage of electrical energy. Therefore, these generating plants must be able to meet a peak demand load which may only be present a few hours a day. Thus, although an existing electrical power generating plant may be sufficient to meet the total average power required over a long term, new generating plants may be required to supplement existing plants simply because there will be times during the day or year that the existing plant cannot meet the peak load. To help eliminate the differences between the peak demand and the average load, most utility companies now operate under what is known as peak demand load billing. That is, rate charges for the killowatt hours used is determined by the peak demand that an establishment may require during a selected time. Consequently, it will be appreciated that business establishments, and now private homes, are encouraged because of this pricing structure to reduce the peak demand load. To this end, it will be appreciated that by preventing the simultaneous application of several large load demanding appliances, such as furnaces, air conditioning units, water heaters and the like, the peak demand load of a home or business establishment may be kept to a minimum.

Therefore, it is an object of this invention to provide apparatus for preventing the simultaneous application of electrical power to large appliances.

Research of the prior art devices, systems, and apparatus which might be considered applicable to this invention has revealed the following patents. U.S. Pat. No. 4,216,384 issued to Fredrick A. Hurley on Aug. 5, 1980, discloses a system for monitoring and controlling the consumption of electrical energy and the peak demand for electrical power in an installation. The current to an individual load circuit is sensed and signals corresponding to these currents are fed into a priority assignment circuit. This in turn controls a shed control circuit so that individual circuits are then disconnected in order to provide a total power consumption which does not exceed a preselected set point applicable for the particular installation. The relative size of a particular load that is shed corresponds with a relative degree of power overdraw.

Another U.S. Pat. No. 4,031,406 issued to Warren L. Leyde et al., on June 21, 1977, discloses an electrical load control system which selectively connects and disconnects loads in a predetermined sequence wherein the ranking of the load in the sequence is selectively rotated in a manner which results in a sharing of an "on" and "off" time and of equalization of wear among the load devices.

Still another U.S. Pat. No. 3,925,680, issued to William A. Dixon on Dec. 9, 1975 discloses a control which is initiated by a temperature monitoring device which monitors the outside temperature of a residence. When the temperature exceeds the preselected value, one of a pair of circuits is disconnected as long as that temperature excess exists. In addition, when the outdoor temperature exceeds the predetermined value, the air conditioning system is cycled between on and off conditions on a timed periodic basis without regard to the temperature inside the residence at least until the temperature outside the residence drops below the predetermined value.

Still another U.S. Pat. No. 3,497,710 issued to E. T. Gormann et al. on Feb. 24, 1970, describes a system for controlling distribution of electrical energy from a power source to a load in a predetermined series of intermittent on and off intervals for a prescribed period of time. The purpose of this control is, for example, to provide a distribution control system for use with pulse cooking and heating wherein it is desirable to furnish a predetermined quantity of heat to each of the plurality of resistance heated food containers. However, as is clear from all of the patents discussed above, even though the general concept of energizing only certain loads to control power consumption is not new, each of these systems is for a specific application, is extremely expensive to install, and requires complex centralized control systems.

Therefore, it is another object of this invention to provide apparatus for preventing the simultaneous application of power to two load devices which apparatus is inexpensive and simple to install.

It is yet another object of this invention to provide apparatus for controlling the simultaneous application of electrical energy to two load devices which allow operation of both devices by cycling between such devices.

DISCLOSURE OF THE INVENTION

Other objects and advantages will in part be obvious, and will in part appear hereinafter, and will be accomplished by the present invention which provides apparatus and methods for preventing the simultaneous application of electrical power of first and second electrical loads. The apparatus and techniques comprise first and second sensing means, one each connected to the first and second electrical loads respectively for determining when the first and second electrical loads are demanding electrical power. These sensing means then provide first and second sensing signals respectively indicative of such demand. The sensing signals or representations of the sensing signals are received at a combining means for providing a timer start signal whenever both the first and second sensing signals or their representations are present at the combining means. In addition, there is included first and second load control means, one of each is connected to the first and second electrical loads for alternately applying and interrupting electrical power to the first and second electrical loads, respectively, in response to a control signal. Also included is a timing means which is suitable for providing the control signal upon receiving the timer start signal. The control signal in a preferred embodiment is a single signal which varies (according to a selected time period) between a high and low value such that the first control means only applies power to the first load when the control signal is at a low value and the second control means only applies power to the second load when the control signal is at the high value. In addition, there may be included latching means for providing the first and second representations of the sensing signals any time the timing means is operating regardless of whether the sensing means are providing their corresponding sensing signals. The purpose of this latching means is to prevent an improper or uncontrolled switching on and off of a load device which can result if the sensing means improperly recognizes the timed switching of the load device (resulting from the operation of this system) as a lack of demand for the operation of the load device.

BRIEF DESCRIPTION OF THE DRAWINGS

The above mentioned features of the present invention will be more clearly understood from consideration of the following description in connection with the accompanying drawings in which:

FIG. 3 shows a timing diagram of the various components of the preferred embodiment of FIG. 2.

BEST MODE FOR CARRYING OUT THE INVENTION

Figure 1:
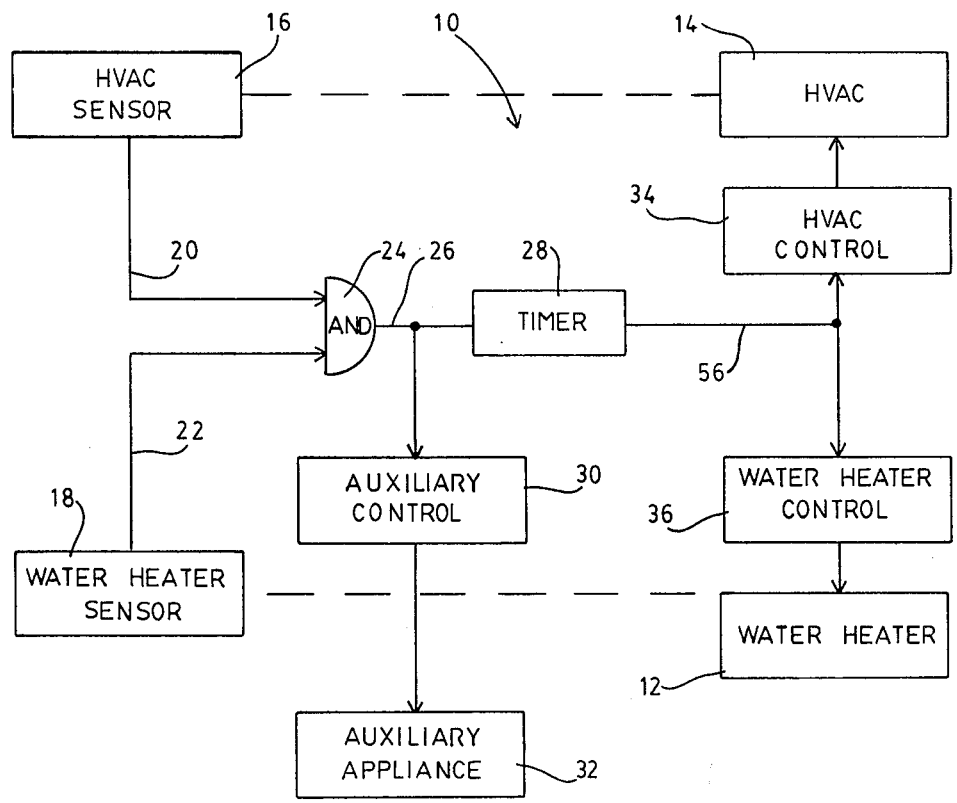
FIG. 1 is a simplified block diagram showing the features of this invention.

Referring now to FIG. 1, there is shown generally at 10 a simplified block diagram which includes the features of this invention. As shown, two high electrical load demanding units such as a water heater 12 and a heating and air conditioning unit (HVAC) 14 are regulated by the system of this invention. As shown, the HVAC system 14 is monitored by a sensing unit 16 which determines when the HVAC system is in a configuration for receiving power for operation. In a similar manner, the sensing unit 18 determines when water heater 12 is in a configuration for receiving electrical power. Although not shown in the simplified block diagram of FIG. 1 the distinction should be made between the load devices 14 and 12 being in a configuration or condition for receiving electrical power and when their thermostat or control units may actually be demanding the application of electrical power. In the later discussions and preferred embodiments of this invention, the importance of this distinction will become apparent. At any rate, once the HVAC's sensing unit 16 and the water heating sensing unit 18 has determined that the HVAC 14 and the water heater 12 respectively are in the proper configuration for receiving the application of power, a pair of input sensing signals on lines 20 and 22 respectively are provided to a combining means such as "And" gate 24. It will be appreciated by those skilled in the art, that "And" gate 24 will only provide a positive or high output on line 26 when both input sensing signals on lines 20 and 22 are present or high. Thus, it will be appreciated that a positive or high signal on line 26 will not be provided by "And" gate 24 except in those situations when the HVAC 14 and the water heater 12 both simultaneously are in a configuration or condition for receiving the application of electrical power. When "And" gate 24 provides a high or positive signal on line 26, this signal is received as a timer start signal by timer means 28. In an alternate embodiment, an auxiliary control unit 30 may also be connected to the output of "And" gate 24 so that any time a positive or high signal is provided on line 26, the auxiliary control unit will interrupt power to the auxilary appliance 32. Referring again to timer 28, it will be appreciated that a signal is provided to both the HVAC control unit 34 and a water heater control unit 36 so that these units can apply and interrupt the application of electrical power to the HVAC unit 14 and the water heater 12 respectively. It will further be appreciated that according to this invention, control signals provided from timer 28 control the operation of the HVAC control unit 34 and water heater control unit 36. Control units 34 and 36 operate to alternately interrupt and apply power to the HVAC unit 14 and water heater 12 on a time basis so that power is not applied to these load devices simultaneously.

Figure 2:
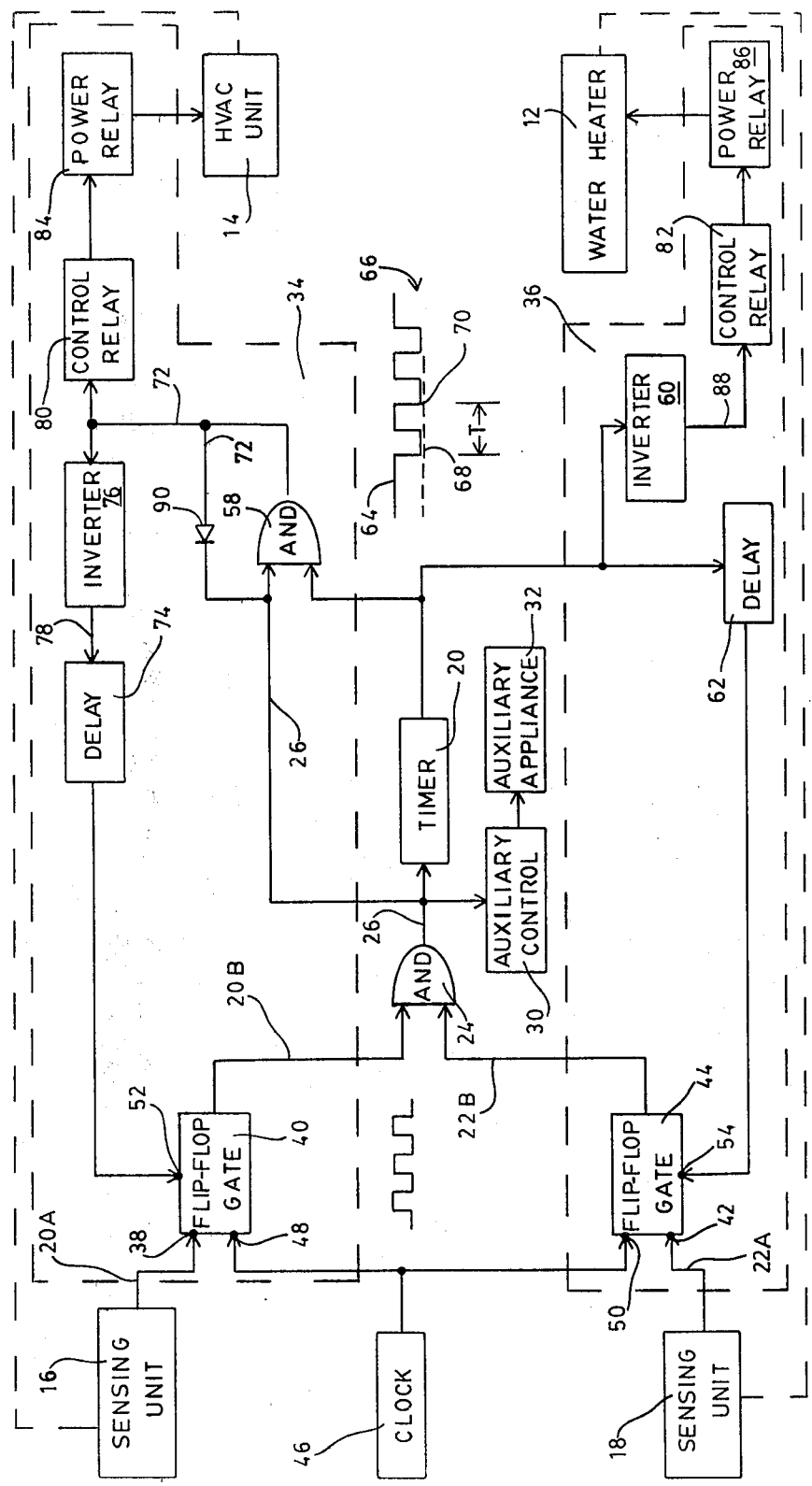
FIG. 2 is a detailed block diagram of the preferred embodiment of the present invention.

Referring now to FIG. 2, there is shown a more detailed block diagram of a preferred embodiment of the invention as discussed in FIG. 1 above. It will be appreciated that those components illustrated in FIG. 2 which correspond to the components discussed with respect to FIG. 1 will carry the same reference numbers.

As shown in this preferred embodiment, the HVAC unit 14 is controlled by the HVAC control unit 34 which in turn receives an input from sensing means 16 on line 20A. In a like manner, hot water heater 12 is controlled by water heater control unit 36 which also receives an input from a sensing means 18 on line 22A. At the same time, the HVAC control unit 34 and water heater control unit 36 provide inputs to "And" gate 24 which in turn controls the operation of timer 28 which as was discussed provides the timing signal to the HVAC control unit 34 and the water heater control unit 36. Referring now to the HVAC input sensing means 16 and the water heater sensing means 18, it will be appreciated that the sensing units may simply be current transformers (not shown) which indicate the presence of a current load being applied to the respective water heater 12 or the HVAC unit 14. Alternately, it will be appreciated that these sensing units could simply monitor the demand of a thermostat in the load devices, or, of course, they could also receive some signal from a central power control system. In any event, the units 16 and 18 continuously monitor the application of electrical load power to their respective load devices. As shown, the output of sensing circuit 16 on line 20A is provided as a HVAC input sensing signal to input 38 of flip flop gate 40 which flip flop gate is a part of HVAC control unit 34. In a similar manner, the output of water heater sensing circuit 18 on line 22A is provided as a water heater input sensing signal to input 42 of flip flop gate 44 which is a part of water heater control unit 36. Also as shown, and as will be discussed hereinafter, flip flop gates 40 and 44 also receive a clocking input signal from clock means 46 at clock inputs 48 and 50 of flip flop gates 40 and 44 respectively. Flip flop gates 40 and 44 also receive set signals at input points 52 and 54 of flip flop gates 40 and 44 respectively. Also as shown, there is an output 20B from flip flop gate 40 and an output 22B from flip flop gate 44. In a preferred embodiment, flip flop gates 40 and 44 operate such that any time the set signals to input points 52 and 54 respectively are at a high level, the outputs on 20B and 22B correspond to and represent the actual state of the input sensing signals on 20A and 22A. The input sensing signals on lines 20A and 22A will be clocked into flip flop gates 40 and 44 respectively when the clock input signal from clock means 46 switches from a low to a high condition. However, when the signals to input points 52 and 54 of flip flop gates 40 and 44 respectively switch to a low condition, the state of the outputs on line 20B and 22B of flip flop gates 42 and 46 respectively will always be in a high condition. Flip flop gates suitable for use with this invention which operate in the manner discussed above are commercially available from National Semiconductor.

As was discussed heretofore with respect to FIG. 2, the output on lines 20B and 22B from flip flop gates 40 and 44 respectively are applied to "And" gate 24. Thus, as will be explained in detail hereinafter, the normal signal level to input 52 and 54 of flip flop gates 40 and 44 respectively is a high signal. Therefore, as was discussed above, the normal circuit configuration is that the signal outputs from sensing circuits 16 and 18, or their representations, be applied directly to "And" gate 24. Consequently, so long as water heater 12 does not demand the application of power at the same time as the HVAC unit 14 or visa versa, then there will only be one high input to "And" gate 24 and therefore there will be a low output from "And" gate 24 on line 26. However, at some point in time, of course, it is likely that both the water heater 12 and the HVAC unit 14 will request the application of power at the same time. In this situation, "And" gate 24 will receive a high signal on both lines 20B and 22B and therefore will provide a high output on line 26. The output on line 26 is applied as a timer start signal to timer 28. In addition, this signal may also be applied to the auxiliary control unit 30 for controlling any auxiliary appliance 32 as was discussed heretofore. Further, as will be discussed hereinafter, the output on line 26 of "And" gate 24 is also applied to a second "And" gate 58 contained as part of the HVAC control unit 34. Referring again to timer 28, it will be appreciated that the output of timer 28 on line 56 is also applied to "And" gate 58 in the HVAC control unit 34, and invertor 60 and delay circuit 62 in the water heater control circuit 36. Further, according to this invention, timer 28 is selected and operated such that the timer output on line 56 is normally a high level signal when the timer is not operating. This normally high level condition of the timer output signal is illustrated at section 64 of curve 66. Further, as shown by curve 66, and according to the preferred embodiment of this invention, when the timer 28 is operating a square wave output signal is provided. This square wave has a time period "T" between points 68 and 70 of curve 66 which may typically be adjusted between 8 and 15 minutes such that the half time period or one half wave will vary between 4 and 7½ minutes. Any suitable timing circuit of course could be used such as for example one controlled by a standard RC network. Thus, it will be appreciated that since the output of timer 28 is normally in the high state as shown by section 64 of curve 66, this high signal will be provided by line 56 to delay circuit 62 and subsequently to the input 54 of flip flop gate 44. Therefore, as was discussed hereinabove, the normal input to flip flop gate 44 is a high level signal. However, as shown, the signal on line 56 is also applied to "And" gate 58 which also receives an input signal from line 26 representing the output of first "And" gate 24. In normal situations therefore, when the timer 28 is not operating a high signal will be provided to "And" gate 58 from the timer. Now, assuming that the HVAC 14 and water heater 12 are not simultaneously demanding power, there will not, of course, be two high signals to "And" gate 24 on lines 20B and 22B, and consequently, the output on line 26 will be low. Therefore, as will be appreciated by those skilled in the art, the output from "And" gate 58 on line 72 will also be low, and if there were no more circuit components, the set input signal to input point 52 through delay circuit 74 to flip flop gate 40 would also be low. However, as shown, the HVAC control unit 34 further includes an inverter 76. Inverter 76 simply changes a high or positive signal to a low or negative signal, or a low signal to a high signal such that when a low signal is received from "And" gate 58 a high signal is provided by inverter 76 on line 78 through delay circuit 74 and subsequently as the high signal to input point 52 of flip flop gate 40. Thus, it will be appreciated that according to this embodiment in the normal, or at rest state, a high signal will be present at both input points 52 and 54 of flip flop gates 40 and 44 respectively.

The timing signal on line 56 which is provided to both the HVAC control circuitry 34 and the water heater control circuitry 36 is also suitable for use as control signals to the coils of small control relays 80 and 82 which have normally open contacts such that these contacts will be closed when a high signal is present. The contacts of control relays 80 and 82 in turn control the normally closed power contactors 84 and 86 respectively. Since the control relays 80 and 82 have normally open contacts when a low signal is present on lines 72 and 88, the contacts of relays 80 and 82 will remain in an open state. This means, of course, that power contactors 84 and 86 are in their normally closed state such that power will be available to the HVAC unit 14 and water heater unit 12 upon demand. It will be appreciated, of course, that anytime the signal on line 72 or the signal on line 88 goes high the appropriate control relay 80 or 82 will close and the corresponding power contactor 84 or 86 will open such that power can no longer be applied to the HVAC unit 14 or the water heater unit 12 respectively.

Therefore, in operation, once timer 28 starts timing the output on line 56 it will eventually switch to a low state. When this happens, the normally open contacts of control relay 82 will close such that the power contactor 86 will open thereby preventing the application of power to water heater 12. At substantially the same time, the low output on line 56 will be provided through delay circuit 62, and then received at input 54 of flip flop gate 44. Thus, (as was discussed heretofore) the output signal level of flip flop gate 44 will remain at a high signal level, just as though water heater 12 were requesting power. The purpose of flip flop gates 40 and 44 operating in such a manner is to provide a high signal level on lines 20B and 22B respectively, in the same manner as if the HVAC unit 14 and water heater unit 12 were demanding power. Thus, the interruption of power to water heater 12 by means of power contactor 86 for example, will not result in the sensing circuit 18 determining that power is no longer being required by water heater 12, which would cause the high signal to "And" gate 24 to switch to a low signal. This would remove the time start signal carried by line 26 to timer 28 such that the output from timer 28 on line 56 would return and remain at a high level. However, with the flip flop gate 44 operating as discussed, the signal input on line 22B to "And" gate 24 will remain at a high level such that a high signal is also provided as an output on line 26 between "And" gate 24 and timer 28.

Further, the operation of the circuitry is such that at substantially the same time, the high signal on line 26 is received at "And" gate 58, the timer 28 will start timing so that the output signal on line 56 switches to a low condition. However, now that the output on line 56 to "And" gate 58 is low, only one of the two inputs to "And" gate 58 is high. Therefore, the output of "And" gate 58 on line 72 will remain low, and the output of inverter 76 will be maintained as a high signal to input point 52 of flip flop gate 40. Also, of course, since a low signal is still present on line 72, the normally open contacts of control relay 80 will remain in the open condition such that the power contactor 80 remains in its normally closed condition and power may be provided to HVAC unit 14 as demanded.

However, as was discussed heretofore, after a selected period of time, the output signal of timer 28 on line 56 will switch again to the high condition as shown by output signal curve 66. After a delay required by delay circuit 62 the signal to input point 54 of flip flop gate 44 will return to a high position. In addition, inverter 60 will change the high signal on line 56 to a low signal output on line 88 such that control relay 82 will be deactivated. The contacts of relay 82 will then switch to the open position which will in turn deactivate power contactor 86 and return its contacts to the normally closed position thereby allowing power to be applied upon demand to water heater 12. At the same time, the signal on line 56 returns to the high position, the output on line 72 from "And" gate 58 will also switch to a high condition, since both inputs to "And" gate 58 will now be high. Consequently, inverter 76 will convert the high signal received on line 72 to a low signal on line 78 which will then be provided through delay circuit 74 as a low signal to input 52 of flip flop gate 40. At the same time, the high signal on line 72 will be provided to the coil of the normally open control relay 80 such that this relay will now activate and close its contacts, thereby activating power contactor 84 and opening its contacts which in turn interrupts power to HVAC unit 14 such that it cannot operate. The operation of flip flop gate 40 will continue to provide a high output on line 20B in the same manner as was discussed with respect to flip flop 44. This high output on line 20B, along with the high output on 22B maintains the high output of "And" gate 24 on line 26. During this period when the HVAC unit 14 is kept from operating, diode 90 keeps line 26 high. This ensures that the HVAC unit 14 does not short cycle which might result in damage to HVAC unit 14. Thus, there has been provided to this point a discussion of a particular circuit and embodiment of the power load control system of this invention.

Referring now to FIG. 3, there is shown a timing diagram illustrating the output of various components of the circuitry discussed with respect to FIG. 2. As can be seen from this timing diagram, between times $T_0$ and $T_9$ the HVAC sensing signal from sensing circuit 16 to HVAC control circuit 34, and the water heater sensing signal from sensing circuit 18 to water heater control circuit 36 are in an exact time relation with the demand of the HVAC unit 14 and water heater 12 respectively as well as the actual application of power to the units. Also, the corresponding outputs of flip flops 40 and 44 respectively are in the same exact time relationship. As an example, and as is shown in the curves of FIG. 3, the HVAC unit 14 is demanding power at the time $T_0$ of the timing diagram. Thus, the HVAC demand curve 92, the HVAC load (power actually applied) curve 94, the HVAC sensing output curve 96, and the flip flop 40 output (curve 98) all correspond time wise. Similarly, at time $T_1$ when there is no longer any demand by the HVAC unit all of these curves return to zero, and still correspond. As shown, they all remain in this state as the demand remains low. Subsequently, at time $T_2$, while the HVAC unit is not demanding power, the water heater 12 now demands power, such that curves 100, 102, 104, and 106 representing the power the sensing circuit output respectively are shown going to the high state and staying there until the demand of the water heater is satisfied at time $T_3$ and all of these curves are returned again to the zero state. Then, as is further shown, the HVAC again demands power at $T_4$ and cuts off at $T_5$. Likewise, the water heater demands power at $T_6$ and cuts off at $T_7$. Then, as shown at time $T_8$ the water heater again demands power and as this load comes on, the sensor circuits and the flip flops are all indicated as being in a high state. It will also be appreciated that at time $T_8$ curve 108 representing the output of the first "And" gate 24 is still in a low condition. That is, the output of "And" gate 24 remains at a low level between $T_0$ through $T_8$ since only one unit is demanding power. During this time, the output of timer 28 is in a high condition as shown by curve 110, since the timer was not operating and that is the timer's normal condition when it is not operating. The output of "And" gate 58 during $T_0$ and $T_8$ is low since only the timer is providing a high input to "And" gate 58. This is shown by curve 112. Therefore, of course, the output of inverter 76 as shown by curve 114 is high since its input is low. Now referring to the critical time of $T_9$, it will be seen that the HVAC unit 14 now demands power at the same time the water heater 12 is operating and under load. Thus, in this situation, and in a manner discussed heretofore, the first "And" gate 24 will now have two positive inputs such that it will provide a positive output. This immediately starts the timer 28 which switches its output to a low condition and results in an interruption of power to the water heater 12, in a manner discussed heretofore, such that the curve 100 representing the load is low and according to this particular embodiment the output from sensor 18 illustrated by curve 106 also switches to a low state. However, as shown by curve 102 the demand for water heater 12 is still high as the water heater had not finished its cycle. Further, the output of flip flop 44 shown by curve 104 remains high since the set input signal to input point 54 went low, and as discussed above the output of flip flop gate 44 will always provide a high signal when the signal input at point 54 is low. It will also be noted, even though the output of "And" gate 24 goes high, (curve 108), the output of "And" gate 58 remains low and the output of inverter 76 remains high as indicated by curves 112 and 114. This is because, at the same time the timer output was switching to a low level, the output from "And" gate 24 on line 26 was going high, and therefore only one of the two inputs to "And" gate 58 was high such that a low level output of "And" gate 58 is continued. Thus, since inverter 76 inverts the output of "And" gate 58, this output also remains at a high level. However, at time $T_{10}$ which represents the half period of the timer output, the timer reverses or switches to its high condition as was discussed heretofore. Of course, when the timer reverses to the high condition, the water heater 12 as was discussed will now again turn on. Also, since "And" gate 58, now has a high signal input from timer 28 on line 78 as well as on line 26, its output will also switch to a high level as indicated on curve 112 and the output of inverter 76 will go low as indicated at curve 114. When the inverter output goes low, power to the HVAC unit 14 will be interrupted as was discussed heretofore, and is indicated by curve 94 as well as the input sensing curve 96. However, as illustrated by curve 98 the output of flip flop gate 90 remains high as does the HVAC demand curve 92. The process of alternating the application of power between the water heater 12 and the HVAC unit 14 will continue so long as both the water heater 12 and the HVAC 14 demand power as is indicated by the time periods $T_{10}$ and $T_{12}$. However, now referring to the time period $T_{13}$ which is the time the HVAC unit 14 has just been turned back on by the timer 28 going to its low condition. As indicated by curve 110, it will be noted that before timer 28 again switches states (see dashed line 116), the demand of the HVAC unit 14 is satisfied and therefore as indicated by demand curve 92 at $T_{14}$ this signal returns to zero. It will be recalled that now input point 52 of flip flop gate 40 is in a high state and therefore the output of flip flop gate 90 as shown by curve 98 corresponds to the input from sensing circuit 16 shown by curve 96. Therefore, since sensing circuit 16 will indicate that no load is being applied or is desired, the output on line 20B to "And" gate 24 will drop to zero, and therefore as shown in curve 108 the output of first "And" gate 24 returns to zero. Thus, the timer 28 will now stop operating and return to its normal state which provides a high level output as indicated by curve 110. Consequently, the water heater will again then be energized as indicated by the load curve 100 and the demand and sensing circuits as well as the flip flop output will follow this demand since the water heater is the only one of the two high load devices now requiring power. Thus, eventually the water heater will satisfy its demand for power and as indicated at time $T_{15}$ the water heater will be de-energized. Then upon demand such as at time $T_{16}$ the HVAC will then again come on and go off ($T_{17}$) without the circuitry of the present invention operating to provide the alternating application and interruption of power.

Thus, although the present invention has been described with respect to specific methods and apparatus for alternatingly interrupting and applying power to a first and second high load device, it is not intended that such specific references be considered limitations upon the scope of this inventions except insofar as is set forth in the following claims.

We claim:

1. Apparatus for preventing the simultaneous application of electrical power to first and second electrical loads comprising:
    a first and second sensing means, one each connected to said first and second electrical loads respectively for determining when said first and second electrical loads demand electrical power, and for providing first and second sensing signals respectively indicative of such demand;
    combining means for receiving first and second representative signals which are representations of said first and second sensing signals respectively and for providing a timer start signal when both said first and second representative signals are equally present at said combining means;
    first and second load control means connected to said first and second electrical loads for alternately applying and interrupting electrical power to said first and second electrical loads respectively in response to a control signal; and
    timing means suitable for providing said control signal to said first and second load control means, upon receiving said timer start signal, such that said electrical loads are prevented from simultaneously receiving electrical power.

2. The apparatus of claim 1 wherein said control signal is a single signal which varies according to a selected time period between a high and a low value, such that after said timer receives said timer start signal, said first load control means only applies power to said first load when said control signal is at said low value, and said second load control means only applies power to said second load when said control signal is at said high value.

3. The apparatus of claims 1 or 2 and further including first and second latching means for providing said first and second representative signals respectively whenever said timing means is operating regardless of whether or not said sensing means are providing corresponding sensing signals.

4. The apparatus of claim 3 wherein said first representative signal provided by said first latching means corresponds to the actual state of said first sensing signal only when one of said timing start signals and a high level of said control signal is present, and always provides a high signal when both said timing start signals and said high level of said control signal are present.

5. The apparatus of claim 1 and further including means for providing a selected time delay to the operation of said second load control means in response to said control signals switching from one of its two states.

6. The apparatus of claims 1 or 2 wherein said first and second representative signals are the actual first and second sensing signals respectively.

7. A method for preventing the simultaneous application of electrical power to first and second electrical loads comprising the steps of:
    sensing the state of said first and second electrical loads to determine when said first and second electrical loads demand electrical power and providing first and second sensing signals respectively indicative of such demand;
    receiving first and second representative signals which are representations of said first and second sensing signals respectively and providing a timer start signal when both said first and second representative signals are present;
    alternately applying and interrupting electrical power to said first and second electrical loads respectively in response to a control signal; and
    providing a timer control signal in response to said timer start signal such that electrical power is alternately applied to said first and second electrical loads.

8. The method of claim 7, and further including the step of alternating said control signal between a high and a low value, applying power to said first load only when said control signal is at said low value and applying power to said second load only when said control signal is at said high value.

9. The method of claim 7 or 8, and further including the step of providing said first and second representative signals when said control signal is present regardless of whether said sensing means are providing said sensing signals.

10. The method of claim 9 and further including the steps of delaying for a selected time the application of power to said second load in response to said control signal when said control signal switches from one of its two states.

11. The method of claims 7 or 8 wherein said first and second representative signals are the actual first and second sensing signals respectively.

12. Apparatus for preventing the simultaneous application of electrical power to first and second electrical loads comprising:

a first and second sensing means, one each connected to said first and second electrical loads respectively, for determining when said first and second electrical loads demand electrical power, and for providing first and second sensing signals respectively indicative of such demand;

combining means for receiving first and second representative signals which are representations of said first and second sensing signals respectively and for providing a timer start signal when both said first and second representative signals are equally present at said combining means;

first and second load control means connected to said first and second electrical loads for alternately applying and interrupting electrical power to said first and second electrical loads respectively in response to a control signal;

timing means suitable for providing said control signal to said first and second load control means, upon receiving said timer start signal, such that said electrical loads are prevented from simultaneously receiving electrical power; and first and second latching means for providing said first and second representative signals respectively whenever said timing means is operating regardless of whether or not said sensing means are providing corresponding sensing signals, wherein said first representative signal provided by said first latching means corresponds to the actual state of said first sensing signal only when one of said timing start signals and a high level of said control signal is present, and always provides a high signal when both said timing start signals and said high level of said control signal are present.

* * * * *